Oct. 6, 1970  P. T. OVERLIE  3,532,968
VISUAL BATTERY CONDITION INDICATOR WITH RELAXATION
OSCILLATOR AND VARIABLE IMPEDANCE MEANS
Filed Aug. 8, 1967

INVENTOR.
PER T. OVERLIE
BY Hofgren, Wegner, Allen,
Stillman & McCord

ATTORNEYS.

United States Patent Office 3,532,968
Patented Oct. 6, 1970

3,532,968
VISUAL BATTERY CONDITION INDICATOR WITH RELAXATION OSCILLATOR AND VARIABLE IMPEDANCE MEANS
Per T. Overlie, Arlington Heights, Ill., assignor to Warwick Electronics Inc., a corporation of Delaware
Filed Aug. 8, 1967, Ser. No. 683,741
Int. Cl. G01n 27/46; G01r 19/16
U.S. Cl. 324—29.5    5 Claims

ABSTRACT OF THE DISCLOSURE

An electronic switch compares the voltage of a battery with a reference voltage, and decreases the resistance of a resistor connected in series with a capacitor when the battery voltage drops below a predetermined value. A neon-glow lamp, connected across the capacitor in a relaxation oscillator circuit, lights each time the voltage thereacross exceeds the ignition voltage of the neon lamp, thereby discharging the capacitor. The resulting charge and discharge of the capacitor causes the neon lamp to flash at a rate which is a function of the battery voltage.

---

This invention relates to an indicator for the condition of a battery.

In electrical circuits powered by a battery, it is desirable to have an indication of the battery condition prior to exhaustion. Such an indication is especially desirable when using a rechargeable battery of the type where too great a discharge may cause permanent damage. A battery condition indicator also helps to prevent the unexpected failure of electrical equipment, by indicating prior to exhaustion that the battery should be replaced or recharged.

In accordance with the invention, the battery condition indicator provides a simple visual indication of the condition of a battery, which indication can easily be observed and understood. More particularly, a light source is caused to blink at a rate proportional to the charge condition of the battery. As the voltage from the battery drops, the rate at which the light source flashes or blinks is decreased, indicating that the battery should be replaced or recharged.

One object of this invention is the provision of an improved indicator for testing the condition of a battery.

One feature of this invention is the provision of a battery condition indicator in which a gas discharge device is connected to a relaxation oscillator type circuit charged at a rate proportional to the condition of the battery. As the ignition voltage of the gas discharge device is exceeded, a visible light output is produced and the charge is dissipated, initiating another charge-discharge cycle at a rate proportional to the condition of the battery. The resulting flashing light output thereby produces a visual indication of the condition of the battery.

Another feature of this invention is the provision of a battery condition indicator which compares the voltage output from a battery with a reference voltage, and changes the time constant of an RC circuit when the battery voltage falls below a predetermined value.

Figure 1:
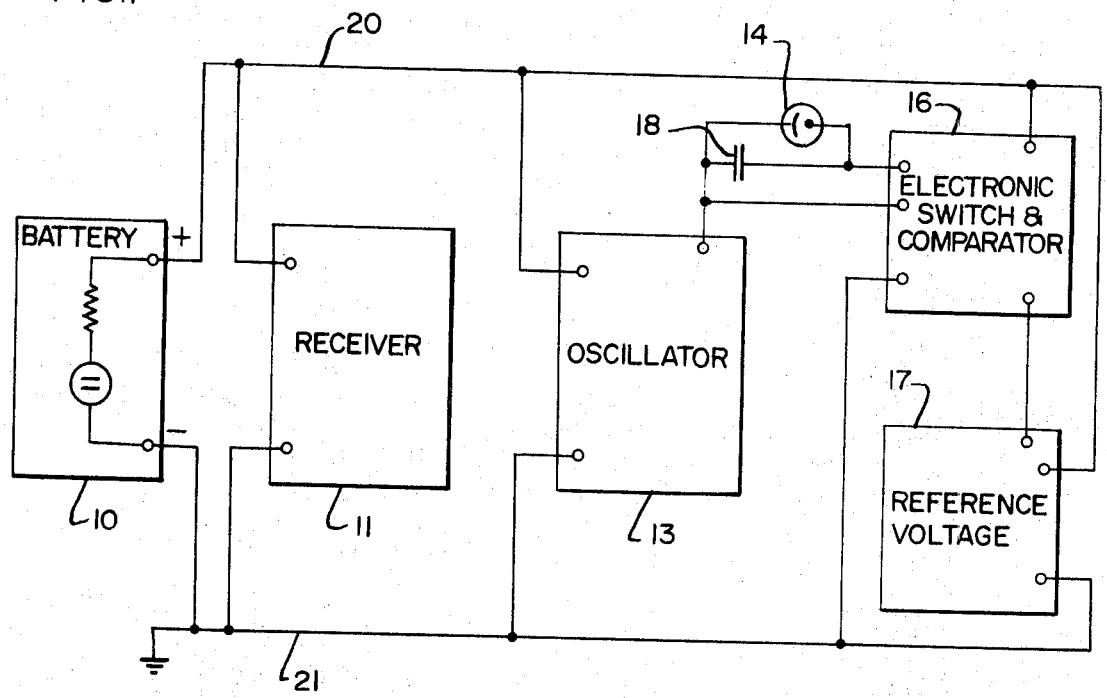
Figure 2:
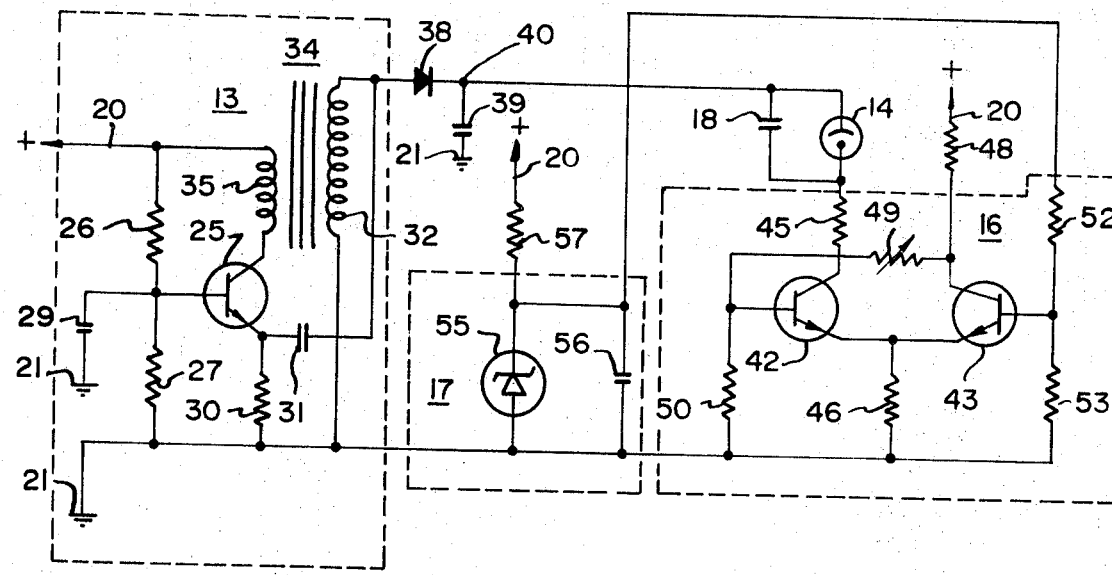

Further features and advantages of the invention will be apparent from the following description and from the drawings, in which:

FIG. 1 is a block diagram of the battery condition indicator as used in a radio receiver; and FIG. 2 is a schematic diagram of the battery condition indicator of FIG. 1.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

In FIG. 1, a DC battery 10 supplies voltage to an electrical circuit, such as a radio receiver 11. A battery condition indicator is connected in parallel with receiver 11, for indicating the charge condition of battery 10. The indicator consists of an oscillator 13 which converts the low battery voltage, as 9 volts, into a pulsating DC voltage having an amplitude sufficient to ignite a gas discharge device 14, as a neon-glow lamp. Discharge device 14 is connected in an RC charging path, the time constant of which is controlled by an electronic switch and comparator 16.

Switch 16 compares the voltage of battery 10 with a reference voltage from source 17. When the voltage from the battery drops below a predetermined value, indicating that the battery should be replaced or recharged, comparator 16 increases the time constant of the RC circuit, causing a capacitor 18 in the RC circuit to charge more slowly towards the ignition voltage of gas discharge device 14. When the ignition voltage is reached, discharge device 14 is ignited to produce a momentary light output, while discharging capacitor 18. As the charge on capacitor 18 is dissipated, the voltage across discharge device 14 is no longer sufficient to maintain ignition, and the light output is extinguished. Capacitor 18 now recharges toward the voltage output from oscillator 13, until the ignition voltage of gas discharge device 14 is again reached, causing another light flash and consequent discharge of the capacitor. The resulting flashing light output indicates the charge condition of battery 10.

Turning now to FIG. 2, the circuit of the battery condition indicator of FIG. 1 is illustrated in detail. The positive polarity output from battery 10 is connected to a (+) power line 20, and the negative polarity side of the battery is connected to a reference potential, or ground 21. The potential of the battery between power lines 20 and 21, which may, for example, be 9 volts, typically used to power small radio receivers, is converted into a high pulsating DC voltage by oscillator 13. An NPN transistor 25 is connected in an oscillator circuit of a type which produces a high voltage output.

More particularly, the junction between a pair of resistors 26 and 27 connected in series across the power lines 20, 21 is connected to the base of transistor 25. The base is bypassed to ground 21 through a capacitor 29. The emitter of transistor 25 is connected to ground 21 through the series combination of resistor 30 and capacitor 31 connected in parallel with winding 32. Winding 32 forms the secondary of a feedback transformer 34, having a primary winding 35 connected between the collector of transistor 25 and the (+) power line 20. The step-up ratio of transformer 34 is sufficient to cause the AC oscillations, at the junction between winding 32 and capacitor 31, to have a voltage which is in excess of the ignition potential of neon lamp 14. This voltage is coupled to a half wave voltage rectifier and smoothing capacitor consisting of a diode 38 and a capacitor 39, respectively. At junction 40 between diode 38 and capacitor 39 there is a pulsating or partly smoothed, DC voltage of approximately +120 volts.

The DC voltage at junction 40 is connected to an RC network consisting of capacitor 18, and the resistance of electronic switch and comparator 16. The comparator consists of a pair of NPN transistors 42 and 43, connected in a multi-vibrator switching circuit. The collector of transistor 42 is connected through a resistor 45 to capacitor 18, while the emitter is connected through a common emitter resistor 46 to ground 21. The operating bias for transistor 42 is determined by series connected resistor 48, variable resistor 49, and resistor 50, forming a voltage divider between (+) line 20 and ground 21. The junction between resistors 49 and 50 is directly connected to the base of transistor 42. The transistor 42 serves as a three terminal variable impedance device, the base of transistor 42 acting as a control terminal.

Transistor 43 has its collector directly connected to the junction between resistors 48 and 49, and its emitter connected to the common emitter resistor 46. The junction between a pair of voltage divider resistors 52 and 53 is connected directly with the base of transistor 43. The voltage divider 52, 53 is connected between the source 17 of reference voltage and ground 21, in order to forward bias the base of transistor 43 with a fixed or constant voltage, regardless of the instantaneous value of the voltage from the battery 10.

The capacitor 56 is charged through resistor 57 to a voltage determined by the breakdown voltage of a Zener diode 55. The voltage across capacitor 56 serves as a reference source and bias voltage for transistor 43 and is held constant by the Zener diode 55. The current drain on source 17, which supplies current to the voltage divider and multivibrator circuit, is very small. If desired, the Zener diode 55 could be replaced with a long life standard voltage cell, as the voltage output would remain substantially constant for several years.

In operation, when the battery is fresh or fully charged, transistor 42 is in its saturated mode, driving transistor 43 into an unsaturated state. The low collector-to-ground impedance of saturated transistor 42, which forms the resistive portion of the RC network, causes capacitor 18 to charge quickly toward the value of voltage available at line 40. Gas discharge device 14, which is connected directly across capacitor 18, is chosen to have an ignition value below the voltage at junction 40. As the voltage across capacitor 18 exceeds the ignition value, neon lamp 14 ignites, generating a visible light output while at the same time producing a very low impedance path across the capacitor to dissipate quickly the charge thereacross. The capacitor voltage now falls below the value necessary to maintain conduction in neon lamp 14, causing the neon lamp to become deenergized, and at the same time raising the impedance thereacross to an extremely high value.

The cycle of operation is now repeated. Capacitor 18 charges to the ignition value, causing the neon lamp to again discharge and produce another flash of light. Because of the very low impedance of the saturated transistor 42, capacitor 18 is quickly charged after each flash of light, causing the neon lamp to flash or blink at a rapid rate which may not be distinguishable by the human eye. As a result, for certain values of circuit components, neon bulb 14 may appear to be constantly energized.

Resistor 49 is adjusted to a resistance value which causes transistors 42 and 43 to switch to their opposite conduction states when the battery voltage drops below a predetermined discharge value. When this happens, transistor 43 is driven into its saturated state, thereby driving transistor 42 into nonconduction. The collector-emitter impedance of transistor 42 now switches to a much higher value, increasing the time constant of the RC charging path. As a result, capacitor 18 charges at a slower rate, thereby slowing down the rate at which neon lamp 14 flashes. The light output from the neon lamp now flashes or blinks at a rate discernable to the human eye, indicating that battery 10 should be replaced or recharged. As the battery voltage drops further in value, the voltage at junction 40 will decrease, causing the neon lamp to blink at a still slower rate in proportion to the voltage from the battery. Thus, the rate at which the neon lamp blinks provides a visual indication of the charge condition of the battery.

The battery condition indicator may be easily mounted within the housing for receiver 11, FIG. 1, with neon lamp 14 being visible outside the housing. Such a structure provides a compact battery condition indicator which may be conveniently located at the equipment which the battery is powering.

I claim:
1. Apparatus for indicating the condition of a battery, comprising:
   a device for emitting light energy;
   a charging electrical path connectable to said battery including a capacitor, variable impedance means having first relatively high and second relatively low impedance states and means coupling said variable impedance to said capacitor to provide a relatively slow and relatively fast time constant for said charging electrical path;
   discharge means including said device, means coupling said discharge means in shunt with said capacitor for discharging said capacitor and causing said device to emit light when the voltage across said capacitor reaches a predetermined level and for terminating the discharge of said capacitor and light emission from said device when said capacitor has discharged a predetermined amount, thus causing periodic emission of light from said device at a frequency dependent upon the time constant of said charging electrical path;
   means coupled to said variable impedance means for changing said variable impedance means from one impedance state to the other when the battery voltage reaches a predetermined value, the frequency of said light emissions being indicative of the condition of said battery.

2. The apparatus of claim 1 wherein said charging electrical path further includes an oscillator connectable to said battery for producing AC oscillations and a rectifier coupling said oscillator to said capacitor for charging said capacitor with rectified AC.

3. The apparatus of claim 1 wherein said variable impedance means is a first transistor having a collector, base and emitter, said collector and emitter being connected in said charging electrical path.

4. The apparatus of claim 3 wherein said means coupled to said variable impedance means for changing said variable impedance means from one impedance state to the other comprises:
   means for deriving a potential indicative of said battery voltage;
   means for producing a reference potential;
   a second transistor having an emitter, base and collector;
   means coupling said emitters of said first and second transistors together, and means coupling a common emitter resistor to the junction between said emitters;
   means coupling said base of said second transistor to said reference potential;
   means coupling said base of said first transistor to said potential indicative of said battery voltage;
   first means coupling said collector of said second transistor to said battery voltage and second means coupling said collector of said second transistor to said base of said first transistor in feedback relation to maintain said first transistor in its saturated conduction mode and said second transistor in its unsaturated conduction mode when said battery voltage is greater than said predetermined value and switching the conduction mode of said first transistor to unsaturated and said second transistor to saturated when said battery voltage is less than said predetermined value.

5. The apparatus of claim 4 wherein said means for producing a reference potential includes a Zener diode and impedance means connectable in series across said battery.

References Cited

UNITED STATES PATENTS

| | | | |
|---|---|---|---|
| 2,053,536 | 9/1936 | Schlesinger | 331—131 |
| 2,654,865 | 10/1953 | Klug | 340—249 X |
| 2,812,491 | 11/1957 | Figlio et al. | |
| 2,923,890 | 2/1960 | Spranger | 331—131 |
| 3,271,673 | 9/1966 | Woroble | 324—122 X |
| 3,349,386 | 10/1967 | Zug | 340—331 X |

GERARD R. STRECKER, Primary Examiner

U.S. Cl. X.R.

324—133; 340—249